(12) United States Patent
Shimazaki et al.

(10) Patent No.: US 7,799,709 B2
(45) Date of Patent: Sep. 21, 2010

(54) WOVEN BELT AND SEATBELT DEVICE (75) Inventors: Sadayuki Shimazaki, Tokyo (JP); Itsuo Tabayashi, Tokyo (JP)

(73) Assignee: Takata Corporation, Tokyo (JP)

( * ) Notice: Subject to any disclaimer, the term of this patent is extended or adjusted under 35 U.S.C. 154(b) by 235 days.

(21) Appl. No.: 11/992,742

(22) PCT Filed: Nov. 22, 2006

(86) PCT No.: PCT/JP2006/323355
§ 371 (c)(1),
(2), (4) Date: Mar. 28, 2008

(87) PCT Pub. No.: WO2007/061009
PCT Pub. Date: May 31, 2007

(65) Prior Publication Data
US 2010/0156166 A1 Jun. 24, 2010

(30) Foreign Application Priority Data
Nov. 28, 2005 (JP) .............................. 2005-342630

(51) Int. Cl.
*D03D 15/00* (2006.01)
(52) U.S. Cl. ........................ 442/199; 442/189; 280/803; 297/468
(58) Field of Classification Search ............. 280/801.1, 280/801.2, 802, 803, 804, 807, 808; 297/468, 297/471, 473, 474, 475, 482, 483; 442/181, 442/189, 192, 197, 199
See application file for complete search history.

(56) References Cited

U.S. PATENT DOCUMENTS

| 5,298,321 | A | * | 3/1994 | Isoda et al. ................. 442/359 |
| 5,713,601 | A | | 2/1998 | Bonigk |
| 2006/0005913 | A1 | | 1/2006 | Berger |
| 2006/0016546 | A1 | | 1/2006 | Berger |
| 2007/0123126 | A1 | | 5/2007 | Shimazaki et al. |
| 2007/0123128 | A1 | | 5/2007 | Shimazaki et al. |
| 2009/0134690 | A1 | | 5/2009 | Shimazaki et al. |

FOREIGN PATENT DOCUMENTS

| EP | 1 849 898 A1 | 10/2007 |
| JP | 2-46881 | 3/1990 |
| JP | 6-257062 | 9/1994 |
| JP | 07-309200 | 11/1995 |

(Continued)

*Primary Examiner*—Arti Singh-Pandey
(74) *Attorney, Agent, or Firm*—Foley & Lardner, LLP (57) ABSTRACT

To improve wear resistance of a woven belt and a seatbelt device including the woven belt A woven belt 101 has a structure formed by weaving a plurality of warp yarns 102 extending in a substantially longitudinal direction of the belt and a plurality of weft yarns 103 extending in a substantially transverse direction of the belt. At least one of the warp yarns 102 and the weft yarns 103 is a fiber bundle containing highly contractible synthetic fiber yarns (e.g., yarns containing a low-melting-point filament component 306 having a relatively low melting point and a high-melting-point filament component 307 having a relatively high melting point) so that the strength of the fiber bundle can be increased, and the wear resistance of the woven belt 101 as a whole can be improved.

8 Claims, 9 Drawing Sheets

FOREIGN PATENT DOCUMENTS

| | | |
|---|---|---|
| JP | 08-72668 | 3/1996 |
| JP | 8-188938 | 7/1996 |
| JP | 8-299161 | 11/1996 |
| JP | 9-31850 | 2/1997 |
| JP | 9-323619 | 12/1997 |
| JP | 10-121323 | 5/1998 |
| JP | 2000-248469 | 9/2000 |
| JP | 2001-234477 | 8/2001 |
| JP | 2001-294122 | 10/2001 |
| JP | 2001-295153 | 10/2001 |
| JP | 2002-029372 | 1/2002 |
| JP | 3291106 | 3/2002 |
| JP | 2002-240680 | 8/2002 |
| JP | 2002-526331 | 8/2002 |
| JP | 2002-362304 | 12/2002 |
| JP | 2004-315984 | 11/2004 |

* cited by examiner

WOVEN BELT AND SEATBELT DEVICE

TECHNICAL FIELD

The present invention relates to a woven belt prepared by weaving a plurality of fiber bundles substantially orthogonal to each other into a strip, in particular, to a woven belt having a high load-bearing strength and a seatbelt device incorporating the woven belt as a webbing.

BACKGROUND ART

Woven belts prepared by weaving high-strength fibers have been widely used as strips for restraining heavy articles and for bundling together a plurality of materials and the like. One well-known example of application of such woven belts is a webbing for seatbelt device for restraining bodies of occupants onto seats such as those of vehicles.

Webbings of seatbelt devices are required to fulfill various quality requirements for comfortableness during fastening and ease of withdrawing the webbing from a retractor, i.e., a device for retracting the webbing, in addition to a basic requirement of a sufficient load-bearing capacity for restraining the body of an occupant in the event of vehicle collision. Accordingly, various techniques for improving the fibers for use in woven belts and weaving structures of the belts have been proposed (for example, refer to patent document 1).

Patent Document 1: Japanese Unexamined Patent Application Publication No. 2004-315984

DISCLOSURE OF INVENTION

Problems to be Solved by the Invention

A woven belt by its nature is not for a temporary use but for repetitive use. For example, in the aforementioned example of the seatbelt device, an occupant fastens the belt as the occupant boards a vehicle and unfastens it as the occupant gets off the vehicle. When the belt is used for material handling or for heavy articles, the belt is unfastened after it is used to restrain or bundle articles and fastened again next time the belt is used.

Since woven belts are expected to be repeatedly fastened and unfastened and put under large tension during the use, they preferably have as high wear resistance as possible.

An object of the present invention is to provide a woven belt with improved wear resistance and a seatbelt device incorporating the woven belt.

Means for Solving the Problems

In order to achieve the object, a first invention provides a woven belt containing first fiber bundles extending in a substantially longitudinal direction of a webbing and second fiber bundles extending in a substantially transverse direction of the webbing, at least one of the first fiber bundle and the second fiber bundles including a fiber bundle containing a highly contractible synthetic fiber yarn.

When the highly contractible synthetic fiber yarn having a thermal contraction ratio higher than that of normal synthetic fiber yarns are used in the first fiber bundle or the second fiber bundles, the fiber bundles melt by heat treatment and thereby strongly adhere to surrounding fiber bundles through fusion-bonding, resulting in improved strength. As a result, wear resistance can be enhanced.

A second invention is characterized in that, in the first invention, the first fiber bundles are fiber bundles containing normal synthetic fiber yarns and the second fiber bundles are fiber bundles containing the highly contractible synthetic fiber yarns.

While fiber bundles of normal synthetic fiber yarns are used as the first fiber bundles, the strength of the fiber bundles can be increased by using the highly contractible synthetic fiber yarns in the second fiber bundles. Thus, the strength and the wear resistance can be improved compared to when both the first and second fiber bundles are normal fiber bundles.

A third invention is characterized in that, in the first or second invention above, the highly contractible synthetic fiber yarns have a contraction ratio of the size after contraction to the size before contraction of 20% to 60%.

When synthetic fiber yarns having a contraction ratio of the size after contraction to the size before contraction of 20% to 60% is used, fusion-bonding effect is accelerated during contraction by heat treatment and the strength of the fiber bundles as a whole can be improved.

A fourth invention is characterized in that, in any of the first to third inventions, the highly contractible synthetic fiber yarns contain a low-melting-point filament component having a relatively low melting point and a high-melting-point filament component having a relatively high melting point.

A significantly high fusion-bonding effect can be attained by heat treatment, which causes, for example, local fusing of the low-melting-point filaments.

A fifth invention is characterized in that, in the fourth invention, the highly contractible synthetic fiber yarns contain the low-melting-point filament component dispersed in the high-melting-point filament component.

By heat treatment, the dispersed low-melting-point filament fuses and securely melt-bonds with the surrounding yarns.

A sixth invention is characterized in that, in the fourth or fifth invention, the melting point of the high-melting-point filament component is 250° C. to 260° C., and the melting point of the low-melting-point filament component is not less than 160° C. and less than 250° C.

In this manner, the low-melting-point filament can be fused without decreasing the strength of the high-melting-point filament component, by curing at 200° C. to 230° C. for 90 to 180 seconds.

A seventh invention is characterized in that, in any of the first to sixth inventions, the number of one of the first fiber bundles and the second fiber bundles is 20 or less per inch of the other fiber bundle.

By reducing the number of one of the fiber bundles to 20 or less, the other fiber bundles weaved therewith exhibit gentle undulating shapes after weaving, and the stress concentration at the curved portions can be reduced. This also increases the strength.

An eighth invention is characterized in that, in any of the first to seventh inventions, at least one of the first fiber bundles and the second fiber bundles is fiber bundles containing zero-twist yarns with an entanglement.

Since the first or second fiber bundle contains the highly contractible synthetic fiber yarns and have entanglements, the strength and wear resistance can be improved using zero-twist yarns without using expensive twisted yarns. Thus, the production cost can be reduced.

A ninth invention provides a seatbelt device including a woven belt for restraining an occupant; a retractor device that can retract the woven belt; a buckle connected to a fixed side member; and a tongue that engages with the buckle, the tongue being attached to the woven belt, in which the woven belt includes first fiber bundles extending in a substantially longitudinal direction of a webbing and second fiber bundles extending in a substantially transverse direction of the webbing, at least one of the first fiber bundles and the second fiber bundles including fiber bundles containing highly contractible synthetic fiber yarns.

In the seatbelt device of the ninth invention, the highly contractible synthetic fiber yarns that undergoes fusion bond by heating are used to form the first or second fiber bundles of the woven belt. Since the yarns melt and strongly adhere onto surrounding fiber bundles through fusion bonding, the strength can be enhanced. As a result, the strength of the fiber bundles as a whole can be increased, and the wear resistance can be improved.

ADVANTAGES OF THE INVENTION

According to a woven belt and a seatbelt device incorporating the woven belt of the present invention, the strength and wear resistance of the woven belt can be improved.

BEST MODE FOR CARRYING OUT THE INVENTION

The embodiments of the present invention will now be described with reference to drawings. In the description below, an example of applying a woven belt of the present invention to a webbing of a seatbelt device is described, and an embodiment related to an overall structure of a common seatbelt device and an embodiment related to a woven belt serving as a webbing of the seatbelt device are described.

Figure 1:
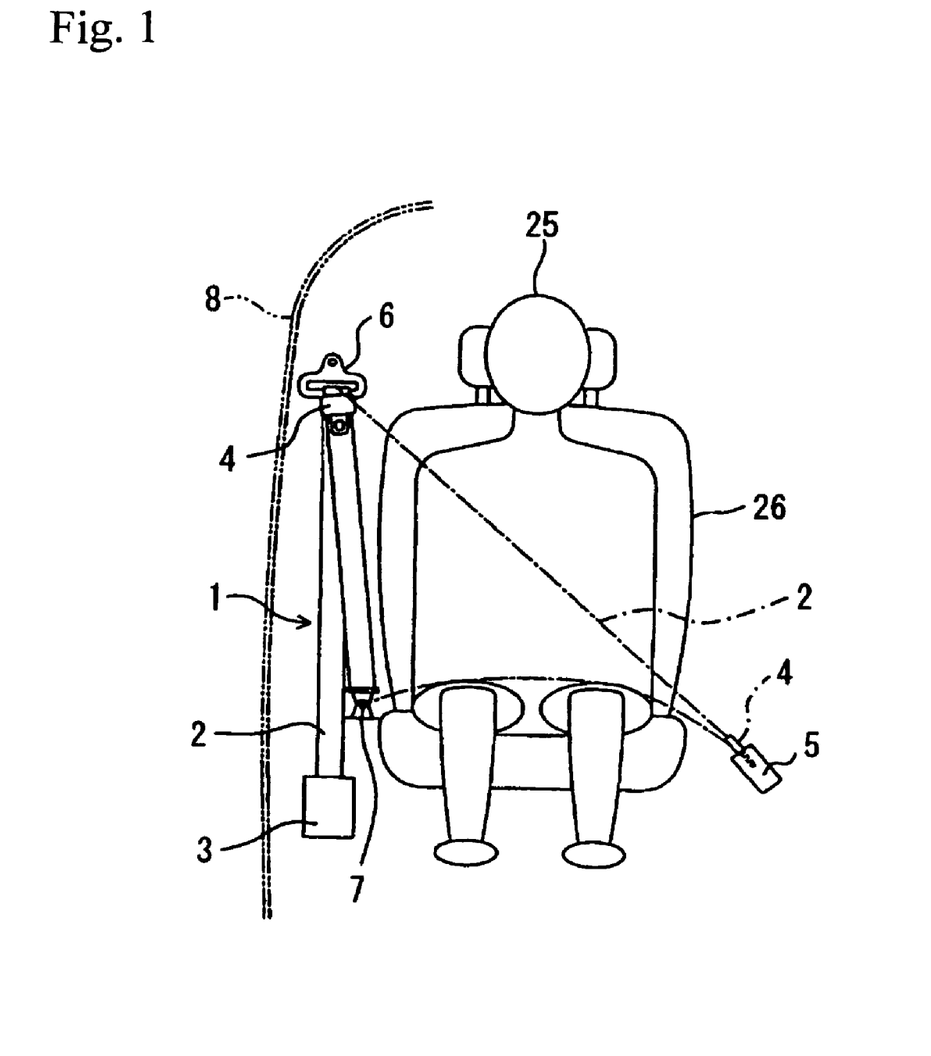
FIG. 1 is a front view showing the overall structure of a seatbelt device according to an embodiment of the present invention along with an occupant.

First, an embodiment of a seatbelt device to which a woven belt can be applied is explained. FIG. 1 is a front view showing an overall structure of a seatbelt device according to an embodiment of the present invention, along with an occupant.

In FIG. 1, a seatbelt device 1 includes a seatbelt 2, which is a webbing, a retractor device 3 for withdrawably retracting one end of the seatbelt 2, a tongue 4 slidably attached to the seatbelt 2, and a buckle unit 5 that engages with the tongue 4.

The seatbelt 2, i.e., a webbing, is a woven belt woven from warp yarns (first fiber bundles) extending in a substantially longitudinal direction and weft yarns (second fiber bundles) extending in a substantially transverse direction. As described above, the belt is retracted by the retractor device 3 from one end thereof, passed through a shoulder anchor 6 at about the middle thereof, and rotatably connected to a vehicle body 8 with a stopper 7 at the other end thereof.

Figure 2:
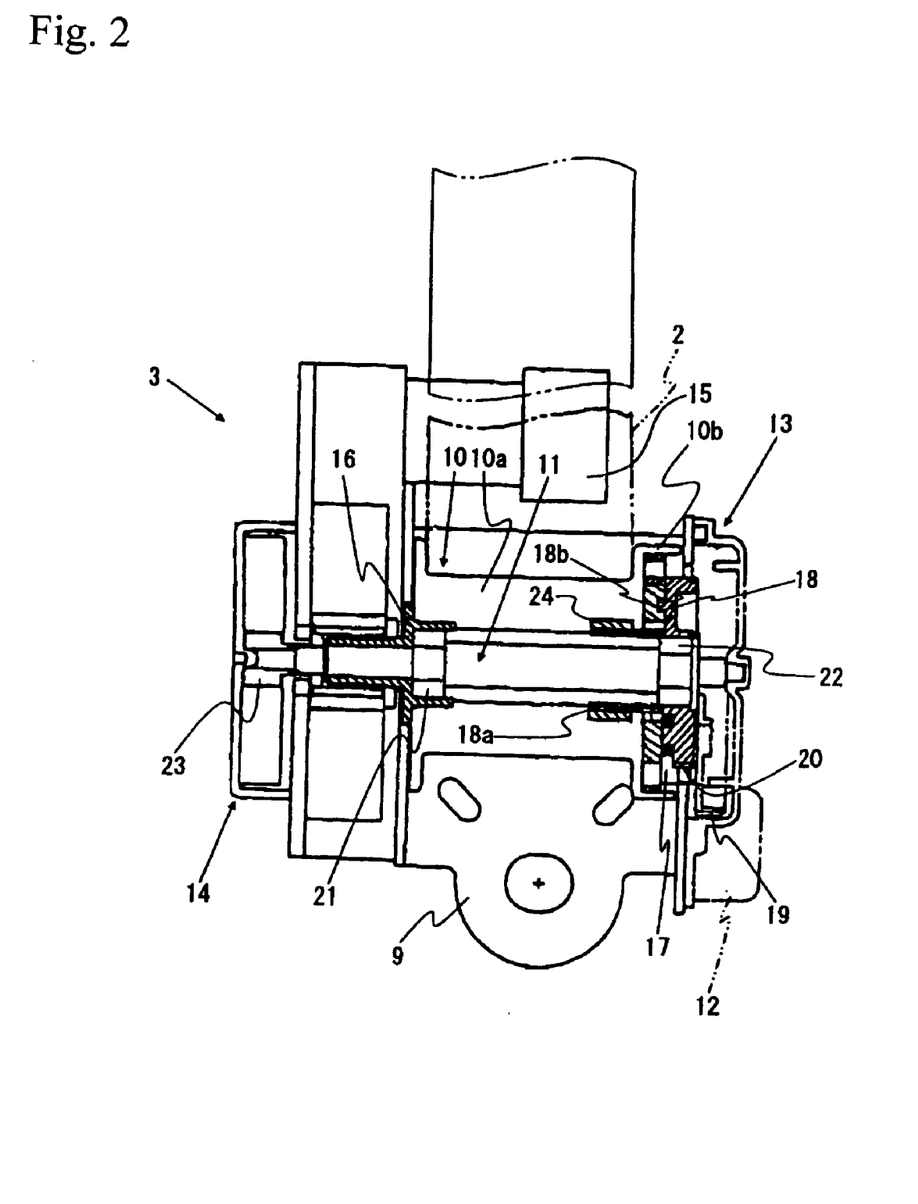
FIG. 2 is a vertical cross-section showing an example of the overall structure of a retractor device.

FIG. 2 is a longitudinal sectional view showing an example of an overall structure of the retractor device 3.

In FIG. 2, the retractor device 3 includes a frame 9, a spool 10 for retracting the seatbelt 2, a torsion bar 11 composed of a material that can undergo torsional deformation, deceleration detecting means 12 that becomes active as it detects a large vehicle deceleration under an emergency situation, a lock mechanism 13 for at least preventing the spool 10 from rotating in the withdrawing direction of the belt, spring means 14 having a spiral spring, a pretensioner 15 that becomes active under an emergency situation to generate a belt-retracting torque, and a bush 16 for transmitting the seatbelt-retracting torque generated by the pretensioner 15 to the spool 10.

The lock mechanism 13 includes a locking base 18 for rockably supporting a pawl 17, and a lock gear 19. The lock gear 19 is sufficient if it has a known configuration and thus a detailed illustration of the structure is omitted in the drawing. The lock gear 19 normally rotates integrally with the torsion bar 11, but stops as the deceleration detecting means 12 is activated under an emergency situation to generate a relative rotational difference between the torsion bar 11 and the lock gear 19 and to thereby allow the pawl 17 to engage with an internal gear 20 at the side wall of the frame 9. As a result, the locking base 18 (in other words, the spool 10) is prevented from rotating in the belt-withdrawing direction. Note that, at this time, although a detailed illustration is omitted, the locking base 18 of the lock mechanism 13 relatively rotates in the seatbelt-withdrawing direction with respect to the lock gear 19 in response to sudden withdrawal of the seatbelt 2. As a result, the withdrawal of the seatbelt 2 is prevented in the same manner described above.

The torsion bar 11 is loose-fitted into the inner-periphery side of the spool 10 (to be more specific, at the center in the radial direction) by penetrating the spool 10 in the axial direction. The torsion bar 11 has a second torque-transmitting portion 21, which is disposed at a first end (left end in FIG. 2) thereof in the axial direction and engaged with a first end of the spool 10 in the axial direction such that the second torque-transmitting portion 21 is not rotatable relative to the spool 10.

The spool 10 has a main cylindrical body 10a for retracting the seatbelt 2 and a large-diameter cylindrical body 10b having a diameter larger than that of the main cylindrical body 10a, and is rotatably supported between the two side walls of the frame 9. The spool 10 is constantly urged in the seatbelt retracting direction by spring force of the spiral spring in the spring means 14 and through a bush 23, the torsion bar 11, the second torque-transmitting portion 21 of the torsion bar 11, and the bush 16. Due to this structure, the first end side of the torsion bar 11 in the axial direction (left side in FIG. 2) is connected to the spool 10 in an integrally rotatable manner. When the pretensioner 15 is activated, the belt-retracting torque generated by the pretensioner 15 is transmitted to the spool 10 through the bush 16, and the spool 10 thereby retracts a predetermined amount of the seatbelt 2.

A circular relative rotation lock member 24 is disposed between the spool 10 and a shaft portion 18a of the locking base 18. The circular relative rotation lock member 24 has an internal thread (not shown) formed on the inner peripheral surface so that an external thread (not shown) formed on the locking base shaft portion 18a is screwed into the internal thread, and is fitted into a hole in the spool 10 extending in the axial direction such that the circular relative rotation lock member 24 cannot rotate relative to the spool 10 but can move in the axial direction. As the spool 10 rotates relative to the locking base 18 in the belt-withdrawing direction, the circular relative rotation lock member 24 rotates integrally with the spool 10 and moves right in FIG. 2.

Referring back to FIG. 1, in a seatbelt device 1 having the above-described basic configuration, an occupant 25 withdraws the seatbelt 2 from the retractor device 3 by resisting the retracting force of the retractor device 3 and inserts the tongue 4 of the seatbelt 2 into the buckle unit 5 to fasten the seatbelt 2. The state of fastening the seatbelt 2 is indicated by a dash-dot line in FIG. 1. As shown in the drawing, the occupant 25 fastens the seatbelt 2 around the chest and the lower abdomen so to restrain himself/herself to a seat 26.

The most distinguishing feature of the seatbelt device having the above-described structure is that fiber bundles containing highly contractible yarns are used in at least one of weft and warp yarns constituting the woven belt, i.e., the seatbelt 2 (webbing).

When the weft or warp yarns include highly contractible synthetic fiber yarns having a contraction ratio (e.g., a contraction ratio of 20% to 60% under a dyeing condition of 210° C. for 180 seconds) higher than the contraction ratio (e.g., a contraction ratio of 15% or less) of typical synthetic fiber yarns, the yarns subjected to the heat treatment melt and strongly adhere to neighboring yarns through fusion-bonding. Thus, the strength of the fiber bundles as a whole can be improved. In the seatbelt device of this embodiment, the strength and wear resistance of the fiber bundles of the woven belt are improved by using the highly contractible synthetic fiber yarns, as described above.

An embodiment of the woven belt of the present invention containing highly contractible synthetic fiber yarns in the warp yarns is described in detail below.

Figure 3:
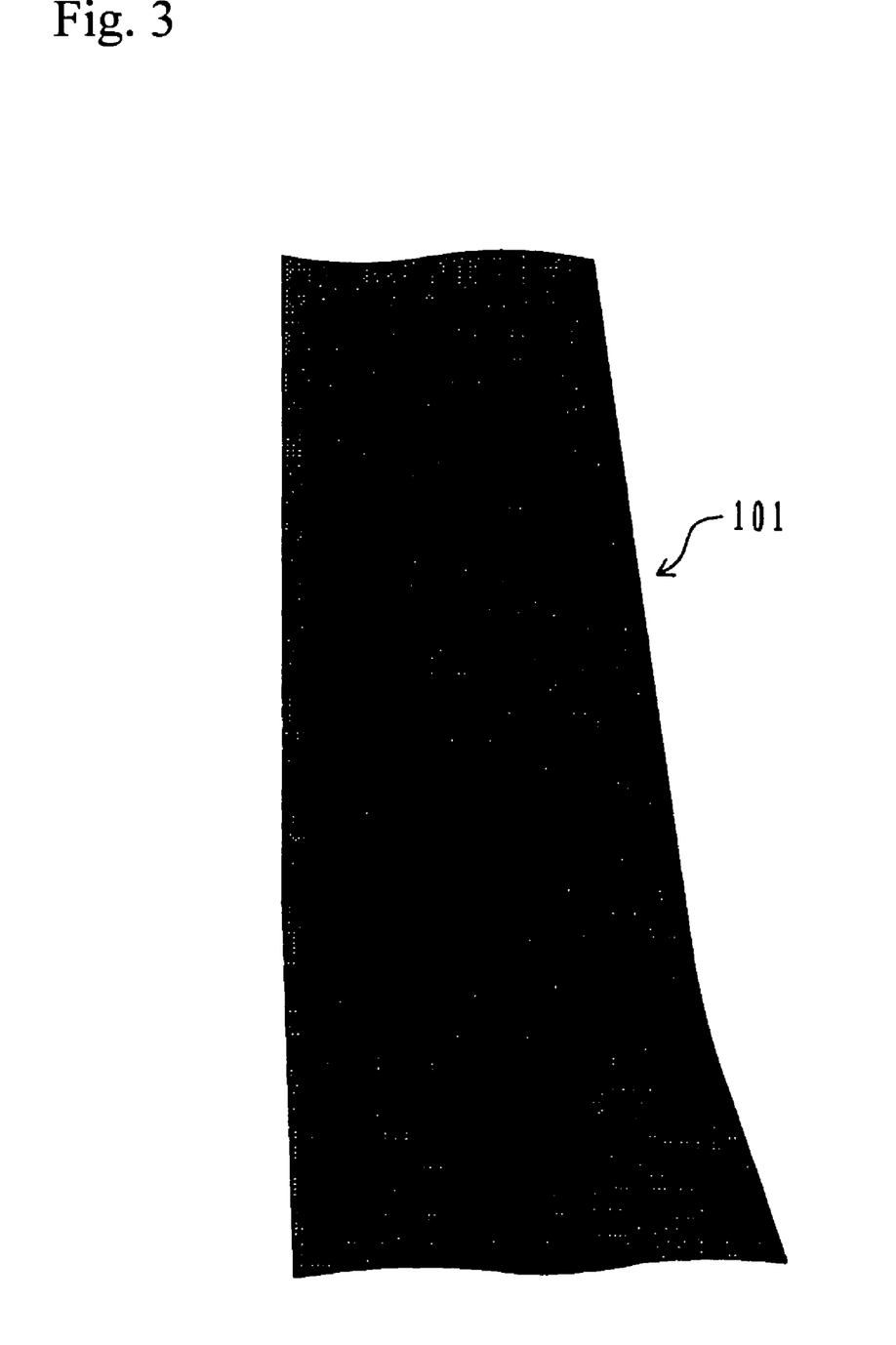
FIG. 3 is an external view of a woven belt according to one embodiment of the present invention.
Figure 4:
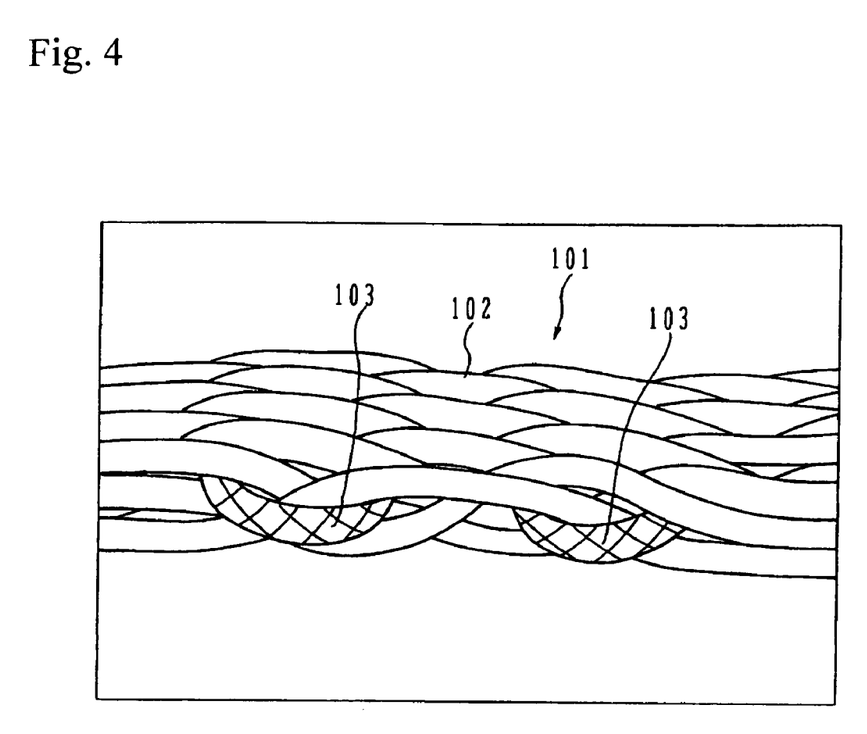
FIG. 4 is an enlarged side view of the woven belt of the embodiment.

FIG. 3 is an external view of a woven belt of this embodiment, and FIG. 4 is an enlarged side view of the woven belt of this embodiment. Referring to FIG. 3, a woven belt 101 of this embodiment is a strip-shaped cloth elongated in the vertical direction of the drawing. The drawing shows a state in which no parts, such as a tongue, are attached at the end.

As shown in FIG. 4, the belt has a structure formed by weaving a plurality of warp yarns 102 extending in a substantially longitudinal direction of the belt and a plurality of weft yarns 103 (the shaded portion in the drawing) extending in a substantially transverse direction of the belt. The weft yarns extend in a substantially straight manner as they extend across in the transverse direction of the woven belt 101 in a reciprocating fashion. In contrast, the warp yarns 102 cross over the weft yarns 103, which extend parallel to each other, by forming undulating shapes.

Both the warp yarns 102 and the weft yarns 103 are fiber bundles of a plurality of single yarns 104 (filaments, the smallest unit of yarns). Of these, the warp yarns 102 are made of typical synthetic fiber yarns. Typically, the warp yarns 102 are composed of polyethylene terephthalate polymers produced by esterification of terephthalic acid and ethylene glycol. In contrast, the weft yarns 103 are constituted from polyester synthetic fiber yarns incorporating highly contractible synthetic fiber yarns. The yarns are zero-twist yarns entangled at predetermined intervals.

Figure 5:
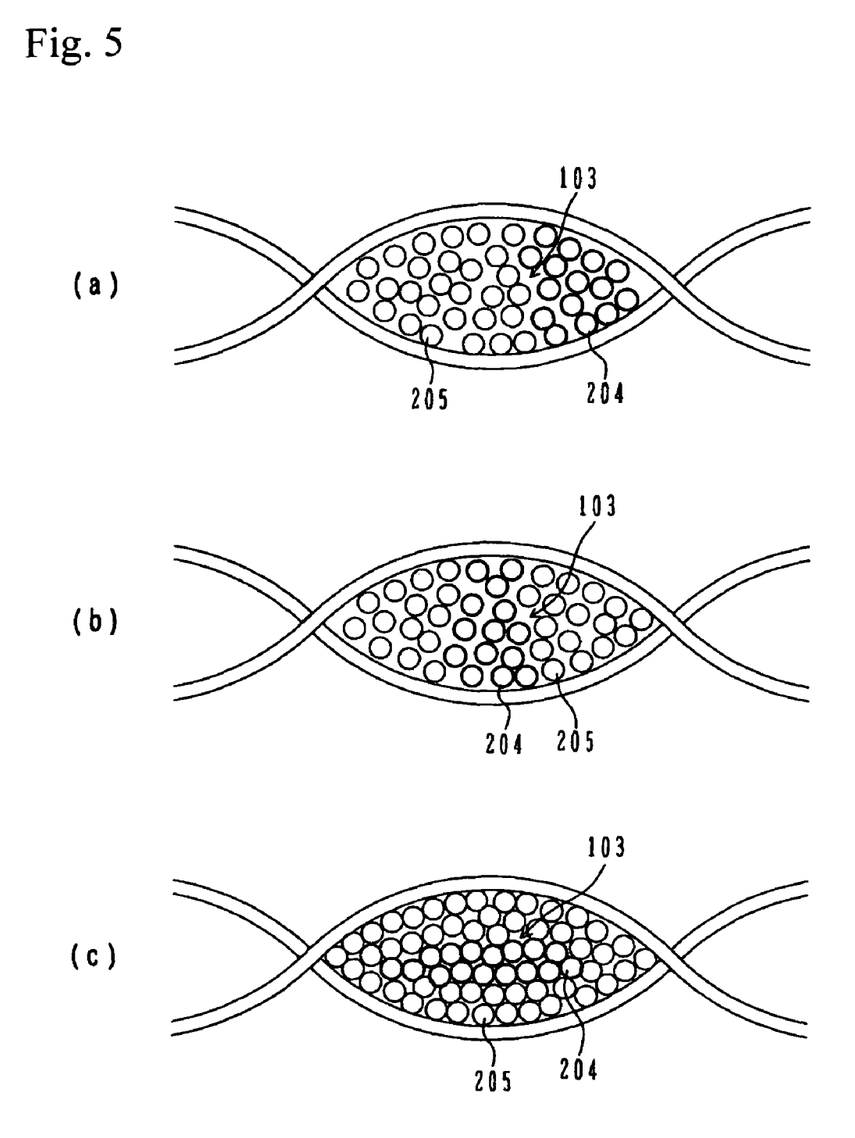
FIG. 5 shows examples of cross-sectional structures of weft yarns of the woven belt of the embodiment.

FIGS. 5(a)-(c) each show an example of a cross-sectional structure of the weft yarn 103 of the woven belt of this embodiment.

In each of FIGS. 5(a), 5(b), and 5(c), the weft yarn 103 is a fiber bundle of zero-twist yarns, about one third of which are highly contractible synthetic fiber yarns 204 and the remainder of which are normal synthetic fiber yarns 205.

In the example shown in FIG. 5(a), the highly contractible synthetic fiber yarns 204 are arranged to huddle at one side (the right side in the drawing) of the cross-sectional structure of the weft yarn 103 while the normal synthetic fiber yarns 205 are arranged to huddle at the other side (the left side in the drawing). Note that the drawing shows highly contractible synthetic fiber yarns 204 after contraction. The highly contractible synthetic fiber yarns 204 before contraction have a diameter larger than that of the normal synthetic fiber yarns 205, but the diameter becomes substantially equal to that of the normal synthetic fiber yarns 205 after contraction.

In the example shown in FIG. 5(b), the highly contractible synthetic fiber yarns 204 are arranged to huddle around the center of the cross-sectional structure of the weft yarn 103 while the normal synthetic fiber yarns 205 are equally divided to huddle at both sides (right and left sides) of the bundle of the highly contractible synthetic fiber yarns 204. This is an example of the case in which weaving is carried out by eliminating the disparity (nonuniformity) in FIG. 5(a) in the horizontal direction.

In the example shown in FIG. 5(c), the highly contractible synthetic fiber yarns 204 are arranged to huddle at the center of the cross-sectional structure of the weft yarn 103 in all directions of the drawing, and the normal synthetic fiber yarns 205 are arranged to uniformly surround the highly contractible synthetic fiber yarns 204. This is an example of the case in which weaving is carried out by further eliminating the disparity (nonuniformity) in FIG. 5(b) not only in the horizontal direction but also in the vertical direction.

Figure 6:
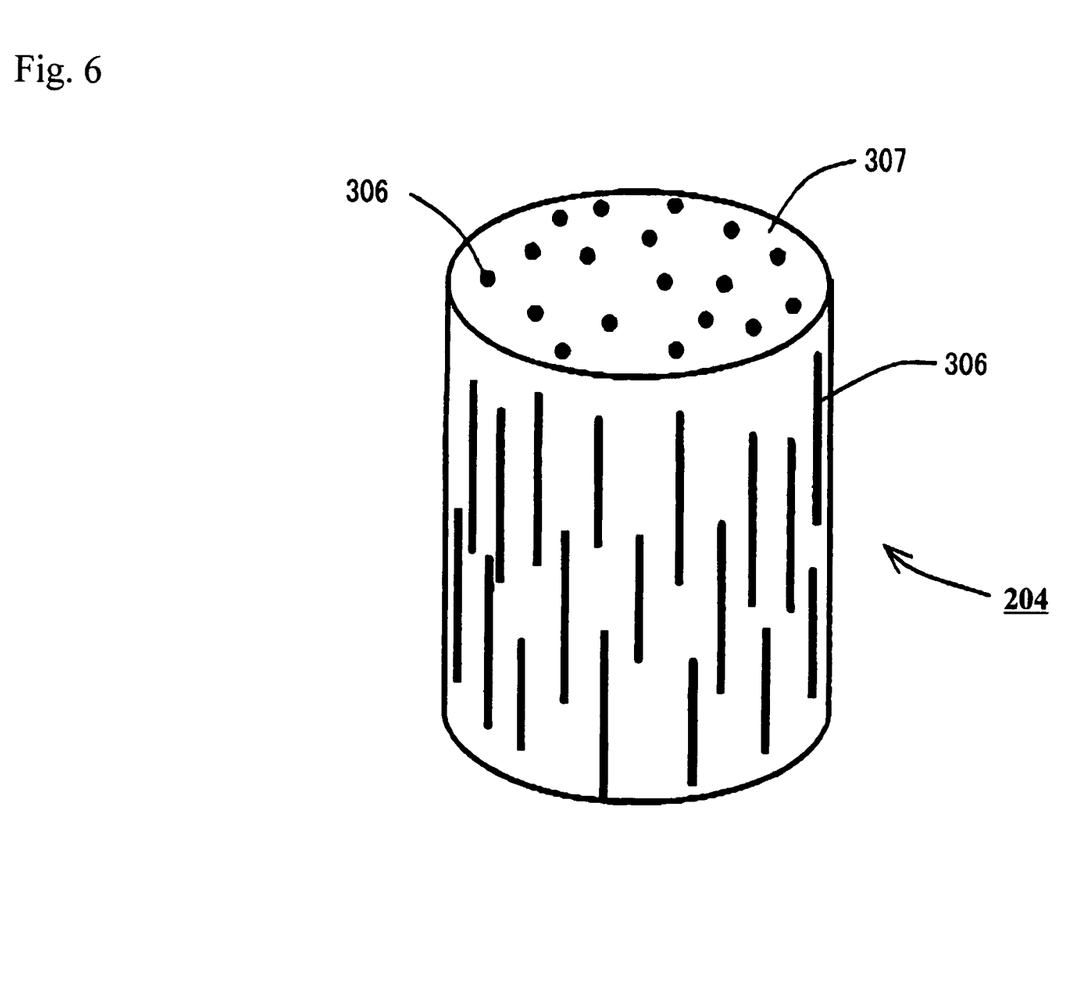
FIG. 6 is a cross-sectional oblique view showing an example of a highly contractible synthetic fiber yarn.

FIG. 6 is an oblique sectional view of an example structure of a highly contractible synthetic fiber yarn 204. In FIG. 6, the highly contractible synthetic fiber yarn 204 is composed of a high-melting-point filament component 307 (70%) and a divided acicular low-melting-point filament component 306 (30%) dispersed therein.

The highly contractible synthetic fiber yarn 204 is composed of a copolymer of polyethylene terephthalate described above and polyethylene isophthalate which are typically produced by esterification of terephthalic acid and isophthalic acid as starting materials, respectively, using ethylene glycol. As shown in FIG. 6, polyethylene isophthalate is dispersed in polyethylene terephthalate. In other words, the highly contractible synthetic fiber yarn 204 is composed of a copolymer in which the low-melting-point filament component 306, which is polyethylene isophthalate having a low melting point, is blended into the high-melting-point filament component 307, which is polyethylene terephthalate having a high melting point. In this embodiment, a fiber unit, known as a multifilament, bundling the highly contractible synthetic fiber yarns 204 (monofilaments) is used in part of the weft. By heating the woven belt 101 including such weft yarns, the dispersed low-melting-point filament component 306 melts to cause contraction of the monofilaments, and the multifilament is thereby converged into a monofilament and is hardened. As a result, the monofilament resulting from the contraction of the weft yarn exhibits a larger cross-sectional area and hardens, and the strength of the woven belt as a whole can be increased.

Note that the melting point of the highly contractible synthetic fiber yarn 204 decreases as the copolymerization ratio of polyethylene isophthalate, i.e., the amount of polyethylene terephthalate used, increases. For example, a highly contractible synthetic fiber yarn having a melting point of 230° C. is obtained when the copolymerization ratio of polyethylene isophthalate is 10% (polyethylene terephthalate: 90%), and a highly contractible synthetic fiber yarn having a melting point of 160° C. is obtained when the copolymerization ratio of polyethylene isophthalate is 30% (polyethylene terephthalate: 70%). In this embodiment, a highly contractible synthetic fiber yarn having a isophthalate copolymerization ratio of 10% and a melting point of 230° C. is used.

Because of the structure shown in FIG. 6, the dispersed low-melting-point filament component 306 melts by heat treatment, and a significantly high fusion-bonding effect can be exhibited in a single, highly contractible synthetic fiber yarn 204 as a whole.

Figure 7:
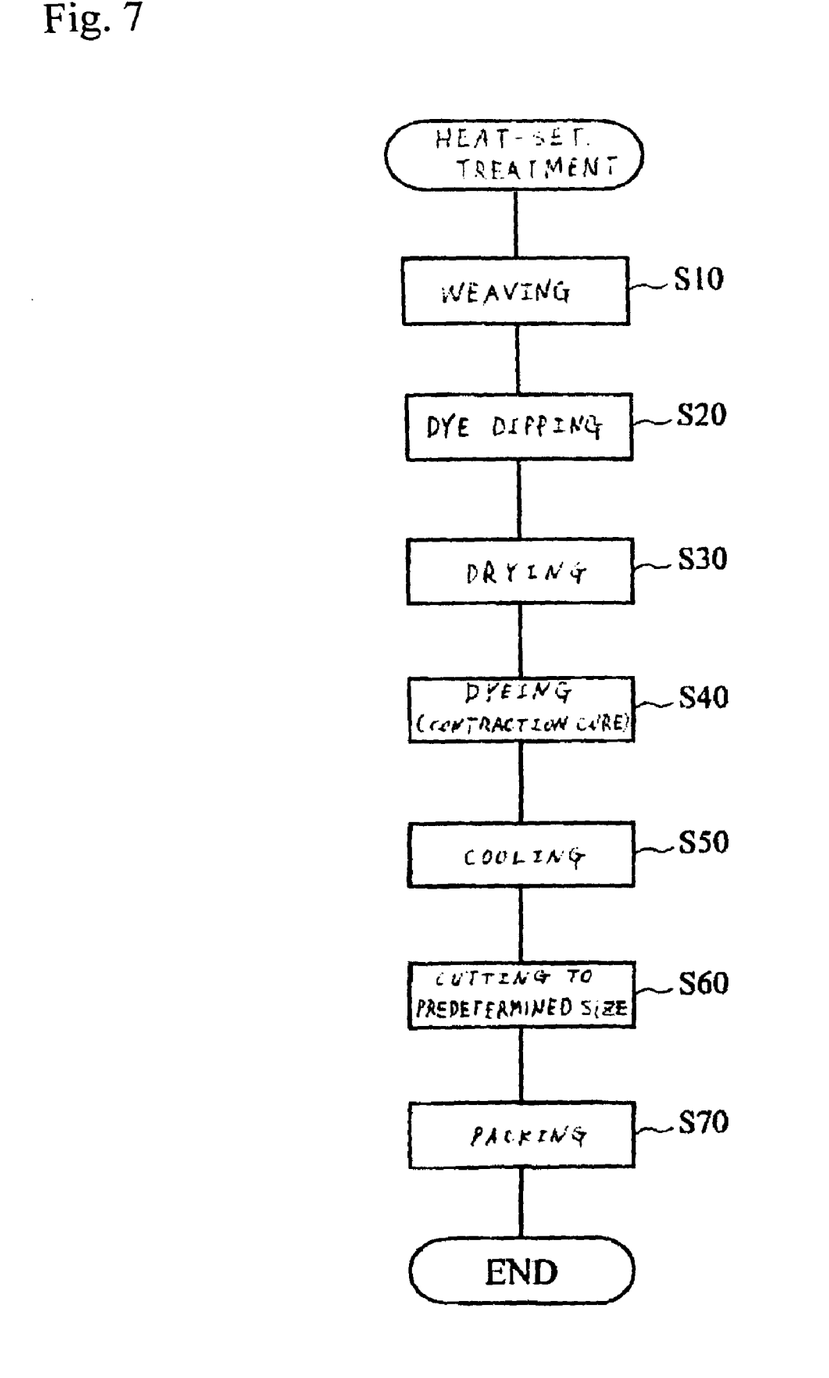
FIG. 7 is a flowchart showing a sequence of heat-treating (heat-setting) the highly contractible synthetic fiber yarn.

FIG. 7 is a flowchart showing a sequence of heat-treating (heat-setting) the highly contractible synthetic fiber yarn 204. The weft yarns 103 having the above-described structure and the warp yarns 102 are woven up (step S10), subjected to a predetermined dyeing treatment (step S20) and drying treatment (step S30), and then cured at 210° C. for 180 seconds to effect contraction (step S40). As a result, in the weft yarn 103, the highly contractible synthetic fiber yarns 204 are contracted and formed into a thicker filament (see FIG. 5). Subsequently, the highly contractible synthetic fiber yarns 204 are cooled to a predetermined temperature (step S50), cut to a predetermined size (step S60), and packed (step S70), to thereby end the sequence. As described above, when the highly contractible synthetic fiber yarns 204 having a contraction ratio higher than regular synthetic fiber yarns are used to form a fiber bundle, the highly contractible synthetic fiber yarns 204 melt by heat treatment and strongly adhere onto surrounding fiber yarns or fiber bundles through fusion-bonding. Consequently, the strength of the fiber bundle as a whole can be increased, and the wear resistance can be improved.

Figure 8:
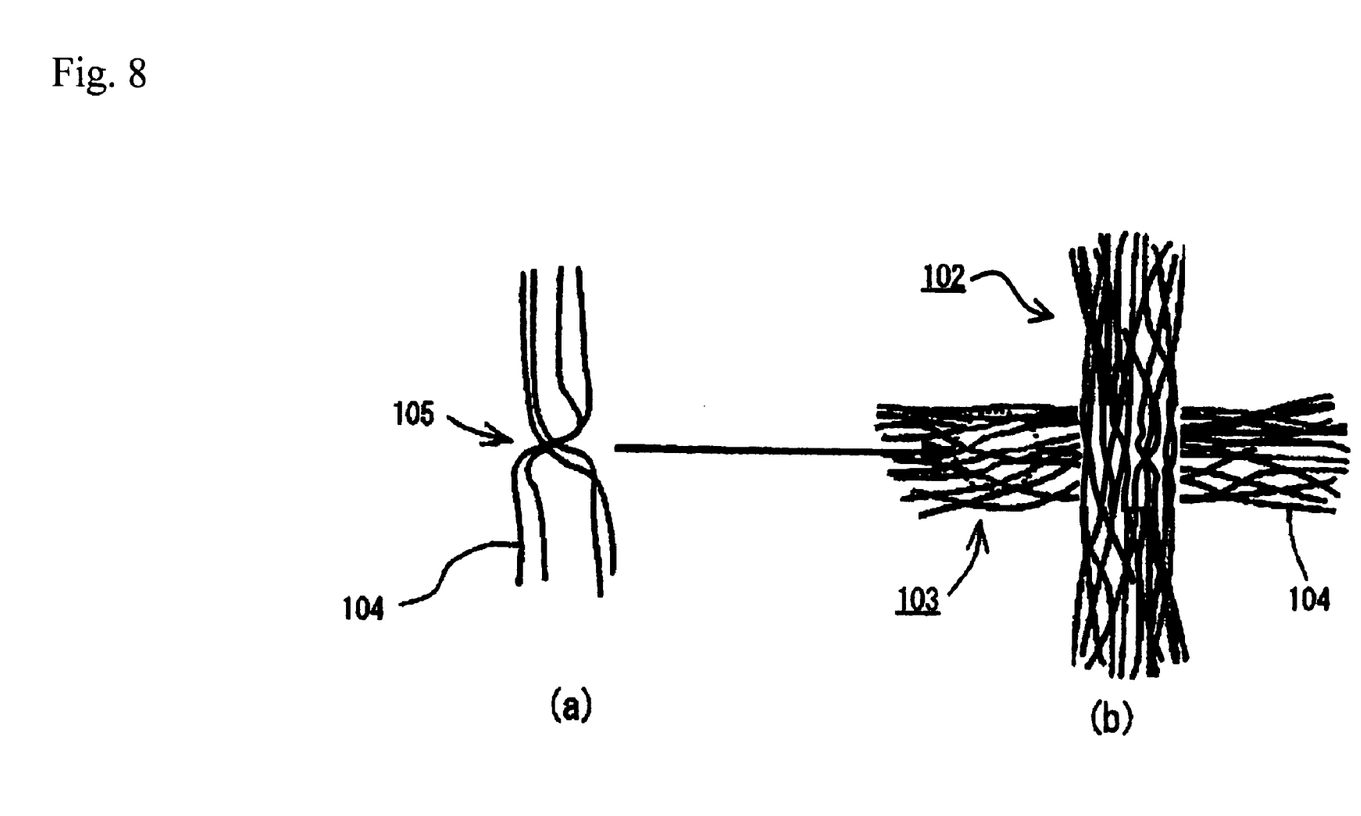
FIG. 8(a) is an enlarged view of a part of the weft yarn of a zero-twixt yarn marked by a dashed circle in FIG. 8(b)
FIG. 8(b) shows a part where a weft yarn intersects a warp yarn.

Zero-twist yarns will now be described. FIG. 8(a) is an enlarged view of a part of the weft yarn 103 marked by a dashed circle in FIG. 8(b), and FIG. 8(b) shows a part where the weft yarn 103 intersects the warp yarn 102. Entanglements 105 shown in FIG. 8(a) are formed at predetermined intervals so that the single yarns 104 do not unravel from one another but can maintain the state of a fiber bundle. The intervals of the entanglements 105 may be adequately adjusted according to the size and number of the single yarns. Although a detailed enlarged illustration is omitted, as with the weft yarn 103, the warp yarn 102 also has entanglements at predetermined intervals. Such zero-twist yarns can reduce the production cost since no twisting step is required, and can form a fiber bundle with increased strength and wear resistance.

As is described above, according to the woven belt 101 of this embodiment, the strength of the fiber bundles can be improved by using the highly contractible synthetic fiber yarns 204 in the weft yarns 103, and the wear resistance can be improved thereby. In this case, by reducing the number of first fiber bundles, which is one of the fiber bundles of the weft yarn 103 and the warp yarn 102, per inch of second fiber bundles, which other fiber bundles of the weft yarn 103 and the warp yarn 102, to 20 or less, the undulating shape of the second fiber bundles after weaving can be moderated, and the stress concentration at the curved portions can be reduced. Thus, the strength can be further increased.

In this embodiment, since the warp yarns 102 and the weft yarns 103 have entanglements 105, the strength and the wear resistance can be secured by using zero-twist yarns without using expensive twisted yarns. Thus, the production cost can be reduced.

Figure 9:
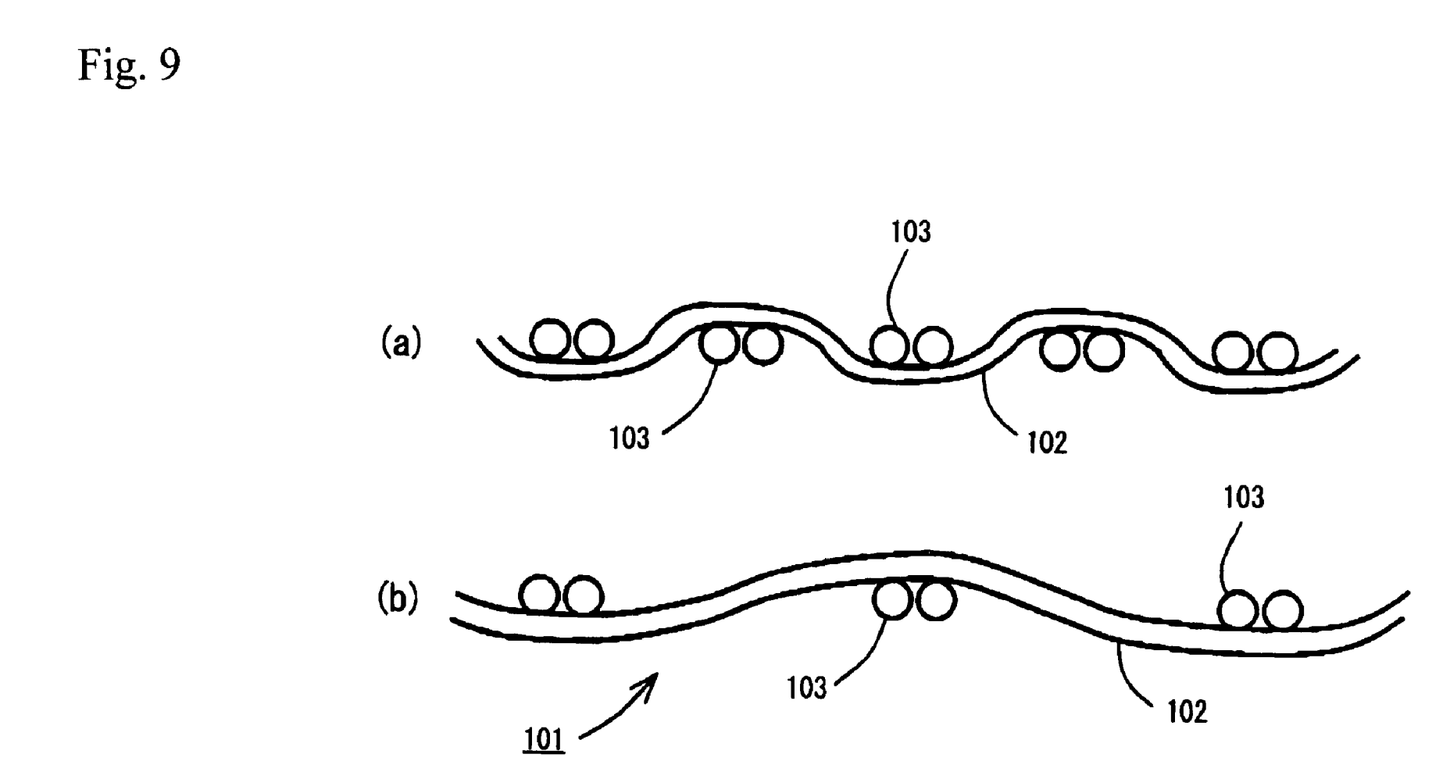
FIG. 9(a) is a side cross-sectional view of the weaving structure of a typical woven belt.
FIG. 9(b) is a side cross-sectional view of the weaving structure of the woven belt of the embodiment.

By utilizing and adapting the effect of increasing the strength and wear resistance described above, the number of the fiber bundles of the weft yarns 103 and the warp yarns 102 can be reduced from that of typical cases while maintaining the strength of the woven belt 101 to a normal level. For example, according to a conventional practice, as shown in FIG. 9(a), it has been necessary to use many weft yarns 103 at small intervals in order to increase the density of the woven belt as a whole and to thereby secure the strength of the woven belt. However, as shown in FIG. 9(b), the strength of the woven belt 101 can be maintained at a normal level even when the number of the weft yarns 103 is decreased to increase the intervals and, furthermore, even when the number of warp yarns is decreased. In this manner, the weight of the woven belt 101 as a whole can be reduced without decreasing the strength since fewer fiber bundles are used.

In this application example, when the number of fiber bundles of one of the weft yarns 103 and the warp yarns 102 is reduced to 20 or less per inch of the fiber bundles of the other, stress concentration at the curved portions can be moderated and the strength can be improved as described above. In addition, the strength of the warp yarns 102 can be maintained while reducing the number of the weft yarns 103 even when the number of the fiber bundles of the warp yarns 102 is reduced to achieve significant weight-reduction. The decrease in strength of the webbing in a substantially transverse direction caused by the decreased weft yarns 103 can be compensated to a normal level by incorporating the highly contractible synthetic fiber yarns 204 in the weft yarns 103. Thus, when the webbing is applied to a seatbelt device, twisting, reversal, jamming, etc., of the belt can be prevented, and ease of withdrawing can be improved.

In this embodiment, the strength of the fiber bundles is increased by using the highly contractible synthetic fiber yarns 204 in the weft yarns 103 while fiber bundles of normal synthetic fiber yarns are used for the warp yarns 102. Even in this case, the strength can be increased compared to when both weft yarns and warp yarns are composed of normal fiber bundles.

Depending on the weaving structure, second fiber bundles, i.e., the weft yarns 103, may be fiber bundles composed of normal synthetic fiber yarns, and first fiber bundles, i.e., the warp yarns 102, may be fiber bundles composed of highly contractible synthetic fiber yarns 204. It is also possible to use the highly contractible synthetic fiber yarns 204 in both the weft yarns 103 and the warp yarns 102. Alternatively, the highly contractible synthetic fiber yarns 204 may be effectively used in part of the weft yarns 103 or the warp yarn 102. Regarding zero-twist yarns, both the warp yarns 102 and the weft yarns 103 may be twisted yarns, or one of the warp yarns 102 and the weft yarns 103 may be twisted yarns.

Although the description of the embodiments of the woven belt and seatbelt device of the present invention ends here, the specific structures of the embodiments described above do not strictly define the contents of the present invention, and it is naturally possible that various modifications may be made in details without departing from the spirit of the present invention. In particular, although the embodiments above are mainly described by using examples of applying the woven belt to the webbing of the seatbelt device used in vehicles and the like, the usage of the woven belt of the present invention is not limited to these. The woven belt of the present invention can be suitably used to bundle heavy articles such as construction materials and as general-purpose belts for suspension and transportation, e.g., other body-restrainers such as safety belts and harnesses.

REFERENCE NUMERALS

1: seatbelt device
2: seatbelt
3: retractor device
4: tongue

5: buckle unit
101: woven belt
102: warp yarn (first fiber bundle)
103: weft yarn (second fiber bundle)
104: single yarn
105: entanglement
204: highly contractible synthetic fiber yarn

The invention claimed is:

1. A woven belt, comprising:
   first fiber bundles extending in a substantially longitudinal direction of the woven belt and second fiber bundles extending in a substantially transverse direction of the woven belt,
   at least one of the first fiber bundle and the second fiber bundles comprising fiber bundles containing highly contractible synthetic fiber yarns, and
   wherein the highly contractible synthetic fiber yarns have a contraction ratio of a size after contraction to a size before contraction of 20% to 60%.

2. The woven belt according to claim 1,
   wherein the first fiber bundles comprise fiber bundles containing normal synthetic fiber yarns and the second fiber bundles comprise fiber bundles containing the highly contractible synthetic fiber yarns.

3. The woven belt according to claim 1,
   wherein the highly contractible synthetic fiber yarns contain a low-melting-point filament component having a relatively low melting point and a high-melting-point filament component having a relatively high melting point.

4. The woven belt according to claim 3,
   wherein the highly contractible synthetic fiber yarns contain the low-melting-point filament component dispersed in the high-melting-point filament component.

5. The woven belt according to claim 3,
   wherein the melting point of the high-melting-point filament component is 250° C. to 260° C., and the melting point of the low-melting-point filament component is not less than 160° C. and less than 250° C.

6. The woven belt according to claim 1,
   wherein the number of one of the first fiber bundles and the second fiber bundles is 20 or less per inch of the other fiber bundles.

7. The woven belt according to claim 1,
   wherein at least one of the first fiber bundles and the second fiber bundles comprises fiber bundles containing zero-twist yarns with entanglements.

8. A seatbelt device comprising:
   a woven belt for restraining an occupant;
   a retractor device configured to retract the woven belt;
   a buckle connected to a fixed side member; and
   a tongue that engages with the buckle, the tongue being attached to the woven belt,
   wherein the woven belt comprises first fiber bundles extending in a substantially longitudinal direction of the woven belt and second fiber bundles extending in a substantially transverse direction of the woven belt, at least one of the first fiber bundles and the second fiber bundles comprising fiber bundles containing highly contractible synthetic fiber yarns, and wherein the highly contractible synthetic fiber yarns have a contraction ratio of a size after contraction to a size before contraction of 20% to 60%.

* * * * *